US006181483B1

United States Patent
Takatsuki (10) Patent No.: US 6,181,483 B1
(45) Date of Patent: Jan. 30, 2001

(54) WIDE-ANGLE LENS WITH LONG BACK FOCUS

(75) Inventor: Akiko Takatsuki, Omiya (JP)

(73) Assignee: Fuji Photo Optical Co., Ltd., Saitama (JP)

( * ) Notice: Under 35 U.S.C. 154(b), the term of this patent shall be extended for 0 days.

(21) Appl. No.: 09/346,394

(22) Filed: Jul. 1, 1999

(30) Foreign Application Priority Data

Jul. 23, 1998 (JP) .................................................. 10-207381

(51) Int. Cl.[7] .................................................. G02B 15/14
(52) U.S. Cl. ........................... 359/691; 359/680; 359/682
(58) Field of Search .................................... 359/691, 690, 359/689, 688, 687, 686, 680, 681, 682

(56) References Cited

U.S. PATENT DOCUMENTS 5,900,987 * 5/1999 Kreitzer .................................. 359/649

FOREIGN PATENT DOCUMENTS 09080303  3/1997 (JP) .
09127413  5/1997 (JP) .

* cited by examiner

Primary Examiner—Georgia Epps
Assistant Examiner—Michael A Lucas
(74) Attorney, Agent, or Firm—Snider & Associates; Ronald R. Snider (57) ABSTRACT

A retro-focus type wide-angle lens attains a wide angle of view of 100 degrees in terms of taking angle of view, a far exit pupil position so as to suppress the occurrence of color shading, and a long back focus which is five times the focal length, thus being sufficient for disposing a three-color-separating optical system. The wide-angle lens comprises, successively from the object side, a first lens group $G_1$, having a negative refracting power, constituted by a negative first-a lens group $G_{1a}$ and a positive first-b lens group $G_{1b}$, and a second lens group $G_2$ having a positive refracting power; and satisfies the following conditional expressions (1) and (2):

$$5.0 < Bf/f \quad (1)$$

$$-0.05 < \tan\theta < 0.05 \quad (2)$$

where
  f is the focal length of the whole system;
  Bf is the back focus of the whole system; and
  θ is an angle formed between a principal ray directed to a screen corner portion and an optical axis.

8 Claims, 6 Drawing Sheets

EXAMPLE 1

FIG. 2
EXAMPLE 2

FIG. 3
EXAMPLE 3

FIG. 5A EXAMPLE 2

FIG. 5B EXAMPLE 2

FIG. 5C EXAMPLE 2

WIDE-ANGLE LENS WITH LONG BACK FOCUS

RELATED APPLICATIONS

This application claims the priority of Japanese Patent Application No. 10-207381 filed on Jul. 23, 1998, which is incorporated herein by reference.

BACKGROUND OF THE INVENTION

1. Field of the Invention

The present invention relates to a wide-angle lens having a taking angle of view of about 100 degrees used in a surveillance camera or the like; and, in particular, to a wide-angle lens having a sufficiently long back focus between the lens and its image surface.

2. Description of the Prior Art

In general, for viewing or capturing a wider area, lenses usable at a wide angle of about 100 degrees are demanded in TV cameras for commercial use which are employed as video cameras, surveillance cameras, and the like. For such a demand, there have been proposed wide-angle lenses disclosed in Japanese Unexamined Patent Publication Nos. 9-80303 and 9-127413.

In the wide-angle lenses disclosed in Japanese Unexamined Patent Publication Nos. 9-80303 and 9-127413, however, back focus is less than three times the focal length thereof. For disposing a three-color-separating optical system between the lens and the image surface, a longer back focus is demanded. Specifically, a back focus of about five times the focal length is required as a back focus sufficient for disposing the three-color-separating optical system.

Also, when disposing a three-color-separating optical system between a wide-angle lens and its image surface, the problem of color shading is needed to be taken into account. Luminous fluxes emitted from the wide-angle lens would be incident on a dichroic film of the three-color-separating optical system with their angles greater as they are directed nearer the corner portions of the screen. Color shading is a phenomenon in which, as the angle of light beam incident on the dichroic film varies, the optical path length within the thin film would vary, thus changing its spectral characteristics, whereby colors would appear differently between the upper and lower parts of the screen.

It is demanded for a wide-angle lens coexisting with a three-color-separating lens to suppress the occurrence of such color shading and favorably correct various kinds of aberration, while having a sufficient back focus.

SUMMARY OF THE INVENTION

In view of such circumstances, it is an object of the present invention to provide a wide-angle lens having a long back focus which is about five times the focal length, while exhibiting a wide angle of 100 degrees in terms of taking angle of view and suppressing the occurrence of color shading.

It is another object of the present invention to favorably correct various kinds of aberration in the above-mentioned wide-angle lens having a long back focus.

The wide-angle lens having a long back focus in accordance with the present invention comprises, successively from an object side, a first lens group having a negative refracting power and a second lens group having a positive refracting power; wherein the first lens group comprises, successively from the object side, a first-a lens group having a negative refracting power and a first-b lens group having a positive refracting power; the wide-angle lens satisfying the following conditional expressions (1) and (2):

$$5.0 < Bf/f \qquad (1)$$

$$-0.05 < \tan\theta < 0.05 \qquad (2)$$

where f is the focal length of the whole system;

Bf is the back focus of the whole system; and

θ is an angle formed between a principal ray directed to a screen corner portion and an optical axis.

Preferably, the wide-angle lens satisfies at least one of the following conditional expressions (3) and (4):

$$-0.50 < f/f_{G1} < -0.10 \qquad (3)$$

$$-0.45 < f/f_{G1a} < -0.23 \qquad (4)$$

where $f_{G1}$ is the composite focal length of the first lens group; and $f_{G1a}$ is the composite focal length of the first-a lens group.

Preferably, in the wide-angle lens having a long back focus in accordance with the present invention, the first lens group comprises, successively from the object side, a first lens made of a negative meniscus lens having a convex surface directed onto the object side, a second lens made of a negative lens, a third lens made of a biconvex lens, a fourth lens made of a negative lens, and a fifth lens made of a positive lens; and the second lens group comprises, successively from the object side, a sixth lens made of a biconcave lens, a seventh lens made of a biconvex lens, eighth and ninth lenses constituting a cemented lens having a positive refracting power as a whole, and a tenth lens made of a biconvex lens;

the wide-angle lens satisfying the following conditional expressions (5) and (6):

$$0.18 < N_8 - N_9 < 0.38 \qquad (5)$$

$$8.0 < R_{13}/D_{13} < 30.0 \qquad (6)$$

where $N_i$ is the refractive index of the i-th lens from the object side;

$R_{13}$ is the radius of curvature of the sixth lens on an image surface side; and $D_{13}$ is the axial space between the sixth and seventh lenses.

DESCRIPTION OF THE PREFERRED EMBODIMENTS

In the following, embodiments of the present invention will be explained with reference to the accompanying drawings.

Figure 1:
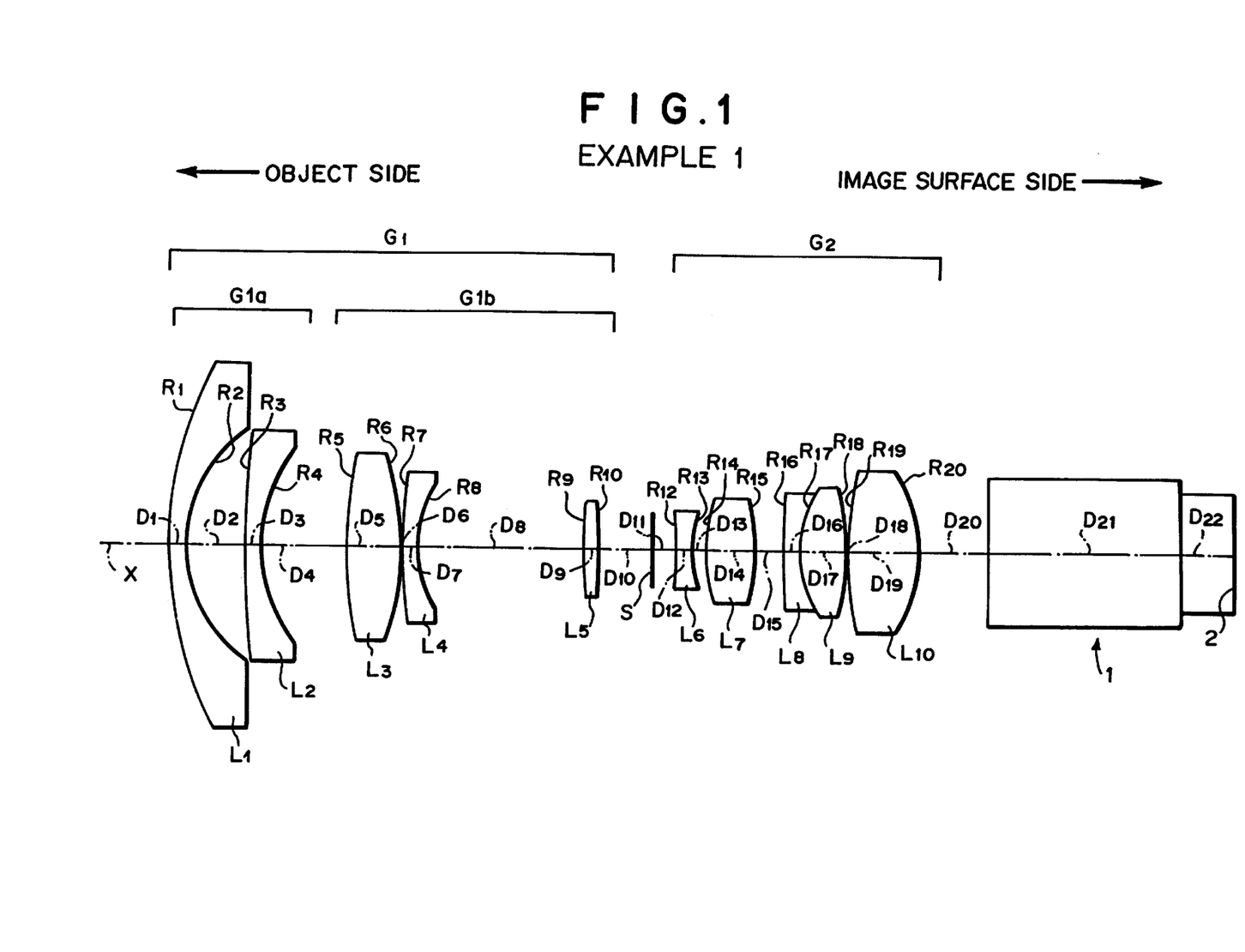
FIG. 1 is a view showing the configuration of the wide-angle lens having a long back focus in accordance with Example 1.

FIG. 1 is a view showing the configuration of the wide-angle lens having a long back focus in accordance with Example 1 as a representative of embodiments of the present invention.

As shown in FIG. 1, the wide-angle lens having a long back focus in accordance with an embodiment of the present invention comprises, successively from the object side, a first lens group $G_1$ having a negative refracting power, a stop S, and a second lens group $G_2$ having a positive refracting power. The first lens group $G_1$ comprises, successively from the object side, a first-a lens group $G_{1a}$ having a negative refracting power and a first-b lens group $G_{1b}$ having a positive refracting power. Luminous fluxes emitted from the wide-angle lens having a long back focus are converged onto an imaging surface 2 by way of a three-color-separating optical system 1 comprising a prism and the like. In FIG. 1, X indicates the optical axis.

Successively from the object side, the first-a lens group $G_{1a}$ comprises a first lens $L_1$ made of a negative meniscus lens having a convex lens directed onto the object side and a second lens $L_2$ made of a negative lens; the first-b lens group $G_{1b}$ comprises a third lens $L_3$ made of a biconvex lens, a fourth lens $L_4$ made of a negative lens, and a fifth lens $L_5$ made of a positive lens; and the second lens group $G_2$ comprises a sixth lens $L_6$ made of a biconcave lens, a seventh lens $L_7$ made of a biconvex lens, an eighth lens $L_8$ and a ninth lens $L_9$ which form a cemented lens having a positive refracting power as a whole, and a tenth lens $L_{10}$ made of a biconvex lens.

Further, the wide-angle lens in accordance with this embodiment is configured so as to satisfy the following conditional expressions (1) to (6):

$$5.0 < Bf/f \tag{1}$$

$$-0.05 < \tan \theta < 0.05 \tag{2}$$

$$-0.50 < f/f_{G1} < -0.10 \tag{3}$$

$$-0.45 < f/f_{G1a} < -0.23 \tag{4}$$

$$0.18 < N_8 - N_9 < 0.38 \tag{5}$$

$$8.0 < R_{13}/D_{13} < 30.0 \tag{6}$$

where f is the focal length of the whole system;

Bf is the back focus of the whole system;

θ is an angle formed between a principal ray directed to a screen corner portion and the optical axis;

$f_{G1a}$ is the composite focal length of the first lens group $G_1$;

$f_{G1a}$ is the composite focal length of the first-a lens group $G_{1a}$;

$N_i$ is the refractive index of the i-th lens from the object side;

$R_{13}$ is the radius of curvature of the sixth lens $L_6$ on the image surface side; and $D_{13}$ is the axial space between the sixth lens $L_6$ and the seventh lens $L_7$.

Conditional expressions (1) to (6) will be explained in detail in the following.

Conditional expression (1) defines a range of back focus. It is a prerequisite for the wide-angle lens having a long back focus in accordance with this embodiment to secure this range of back focus in order to dispose a three-color-separating optical system 1 between the lens and the image surface. If the back focus so short that the lower limit value of the expression is not fulfilled, then it is difficult to dispose the three-color-separating optical system 1.

Conditional expression (2) defines the angle formed between a principal ray directed to a screen corner portion and the optical axis. Outside its upper and lower limits, there would be a problem that color shading is likely to occur.

As mentioned above, color shading occurs due to the fact that light beams are incident on a dichroic film in the three-color-separating optical system 1 at different angles. For suppressing the occurrence of such color shading, it is necessary for the exit pupil position to be set far so as to reduce differences in angle of light beams, corresponding to individual portions of the screen, which are incident on the dichroic film of the three-color-separating optical system 1.

In this embodiment, the angle formed between the optical axis X and the principal ray passing through the center position of the stop S so as to be directed to a screen corner portion is very small as defined by conditional expression (2), whereby the system can be considered nearly telecentric. As a consequence, with the value range defined by conditional expression (2), the exit pupil position can be set considerably far from the imaging surface position, whereby color shading can be prevented from occurring.

Conditional expression (3) is concerned with the composite power of the first lens group $G_1$. In general, a retro-focus type in which respective lenses having negative and positive refracting powers are successively disposed from the object side has been known as a configuration for yielding a longer back focus in a wide-angle lens. This embodiment belongs to the retro-focus type as well. Though a longer back focus can be attained as the negative power of the lens on the object side is greater in the retro-focus type, it will be problematic in terms of aberration if the power is too strong. Hence, if the power is so weak that the upper limit value of conditional expression (3) is surpassed, then the back focus may be too short. If the power is so strong that the lower limit value of the expression is not fulfilled, on the other hand, then it is difficult to correct astigmatism, and Petzval sum becomes greater in the negative direction, thereby making it difficult to correct image surface curvature.

Conditional expression (4) is a condition concerning the composite power of the first-a lens group $G_{1a}$. If the negative power is so weak that the upper limit value of the expression is surpassed, then a sufficient back focus may not be obtained. If the negative power is so strong that the lower limit value is not fulfilled, then the radius of curvature of the concave surface, on the image surface side, of each of the lenses $L_1$, $L_2$ in the first-a lens group $G_{1a}$ becomes so small that its manufacture will be difficult, and distortion will increase.

Conditional expression (5) is concerned with the refractive indexes of the eighth lens $L_8$ and ninth lens $L_9$ forming a cemented lens. If the upper limit value of the expression is surpassed, then Petzval sum becomes greater in the negative direction, whereby the image surface curvature increases in the positive direction. If the lower limit value of the expression is not fulfilled, on the other hand, it will be unfavorable in that both spherical aberration and image surface curvature become greater in the negative direction.

Conditional expression (6) defines the ratio of the radius of curvature $R_{13}$ of the sixth lens $L_6$ on the image surface side to the axial space between the sixth lens $L_6$ and seventh lens $L_7$. If the upper limit value of the expression is surpassed, then it becomes difficult to correct astigmatism. If the lower limit value of the expression is not fulfilled, it will be unfavorable in that spherical aberration becomes greater in the negative direction.

In the following, specific examples of embodiments of the present invention will be described.

EXAMPLE 1

The wide-angle lens having a long back focus in accordance with Example 1 has a configuration shown in FIG. 1.

Namely, successively from the object side, in the wide-angle lens having a long back focus in accordance with Example 1, the first-a lens group $G_{1a}$ is constituted by the first lens $L_1$ and second lens $L_2$ each made of a negative meniscus lens having a convex surface directed onto the object side; the first-b lens group $G_{1b}$ is constituted by the third lens $L_3$ made of a biconvex lens having a surface with a greater curvature directed onto the image surface side, the fourth lens $L_4$ made of a negative meniscus lens having a convex surface directed onto the object side, and the fifth lens $L_5$ made of a biconvex lens having a surface with a greater curvature directed onto the object side; and the second lens group $G_2$ is constituted by the sixth lens $L_6$ made of a biconcave lens having a surface with a greater curvature directed onto the image surface side, the seventh lens $L_7$ made of a biconvex lens having a surface with a greater curvature directed onto the object side, the eighth lens $L_8$ made of a negative meniscus lens having a convex surface directed onto the object side, the ninth lens $L_9$ made of a biconvex lens having a surface with a greater curvature directed onto the object side, and the tenth lens $L_{10}$ made of a biconvex lens having a surface with a greater curvature directed onto the image surface side. Here, the eighth lens $L_8$ and the ninth lens $L_9$ form a cemented lens having a positive refracting power as a whole.

Table 1 (follows) shows the radius of curvature R (mm) of each lens surface, axial surface space of each lens (center thickness of each lens or air space between neighboring lenses) D (mm), and refractive index $N_D$ and Abbe number v of each lens at D-line in Example 1. Also, the lower part of Table 1 shows the focal length f (mm) of the whole system, F number, distance $D_{EXP}$ (mm) from the imaging surface position to the exit pupil position, and respective values corresponding to conditional expressions (1) to (6). In Table 1 and other Tables which will follow, the numbers referring to the individual sets of symbols successively increase from the object side.

As shown in Table 1, Example 1 satisfies all of conditional expressions (1) to (6), thus clearly being a wide-angle lens having a long back focus and a far exit pupil position.

EXAMPLE 2

Figure 2:
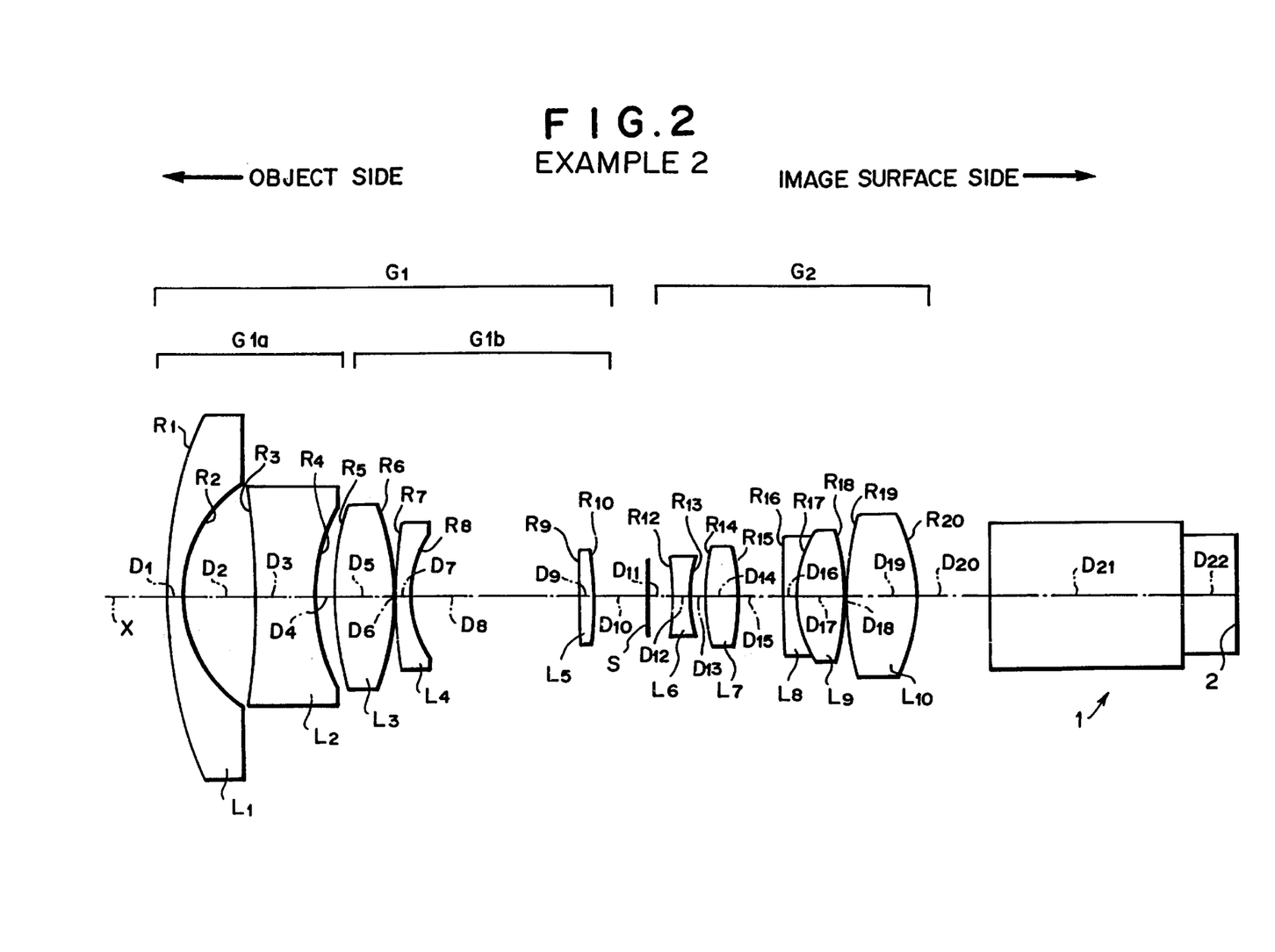
FIG. 2 is a view showing the configuration of the wide-angle lens having a long back focus in accordance with Example 2.

FIG. 2 shows the configuration of the wide-angle lens having a long back focus in accordance with Example 2. This configuration is substantially the same as that of Example 1 except for the forms of the second lens $L_2$ and fifth lens $L_5$. Namely, the second lens $L_2$ is made of a biconcave lens having a surface with a greater curvature directed onto the image surface side, whereas the fifth lens $L_5$ is made of a positive meniscus lens having a convex surface directed onto the image surface side.

Table 2 (follows) shows the radius of curvature R (mm) of each lens surface, axial surface space of each lens (center thickness of each lens or air space between neighboring lenses) D (mm), and refractive index $N_D$ and Abbe number v of each lens at D-line in Example 2. Also, the lower part of Table 2 shows the focal length f (mm) of the whole system, F number, distance $D_{EXP}$ (mm) from the imaging surface position to the exit pupil position, and respective values corresponding to conditional expressions (1) to (6).

As shown in Table 2, Example 2 satisfies all of conditional expressions (1) to (6), thus clearly being a wide-angle lens having a long back focus and a far exit pupil position.

EXAMPLE 3

Figure 3:
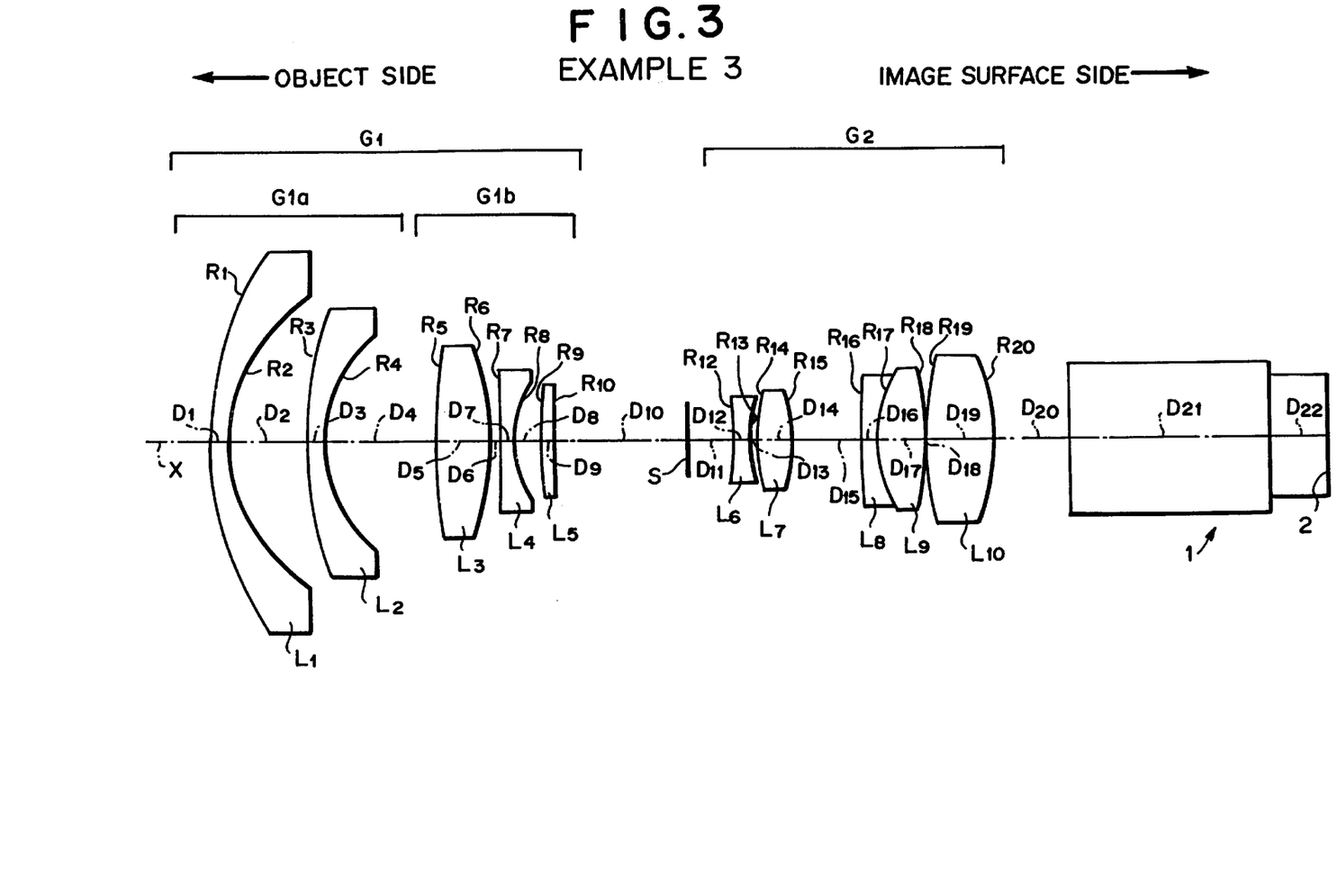
FIG. 3 is a view showing the configuration of the wide-angle lens having a long back focus in accordance with Example 3.
Figure 4A:
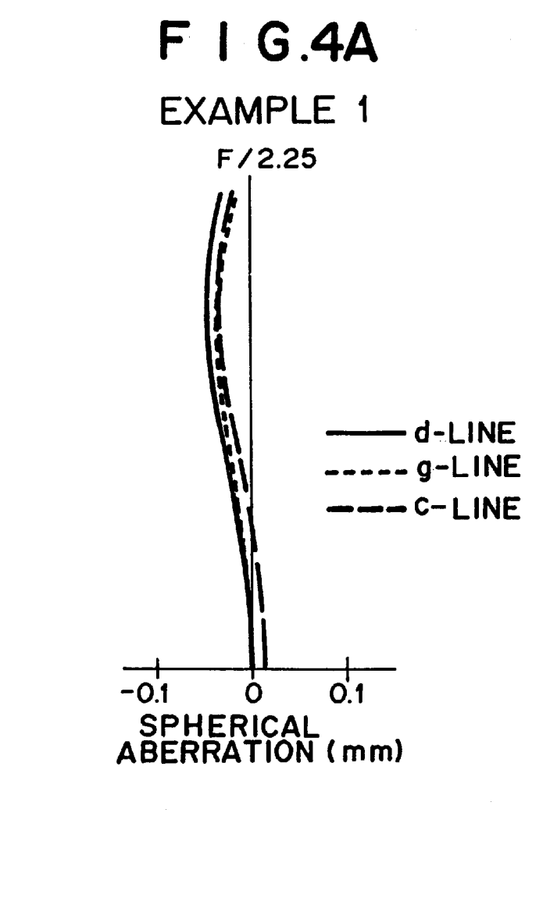
FIGS. 4A, 4B and 4C are aberration charts of the wide-angle lens having a long back focus in accordance with Example 1.
Figure 4B:
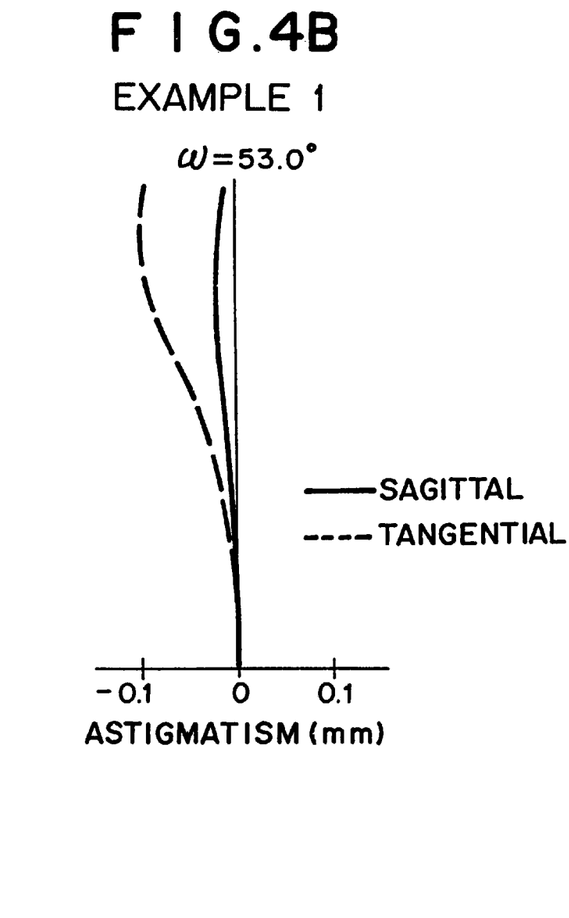
Figure 4C:
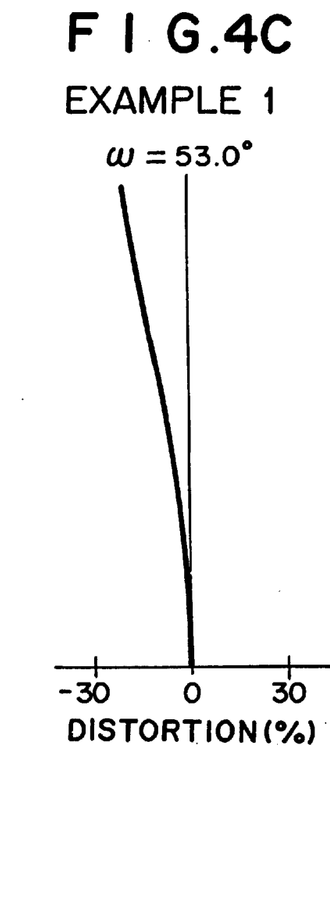
Figure 5A:
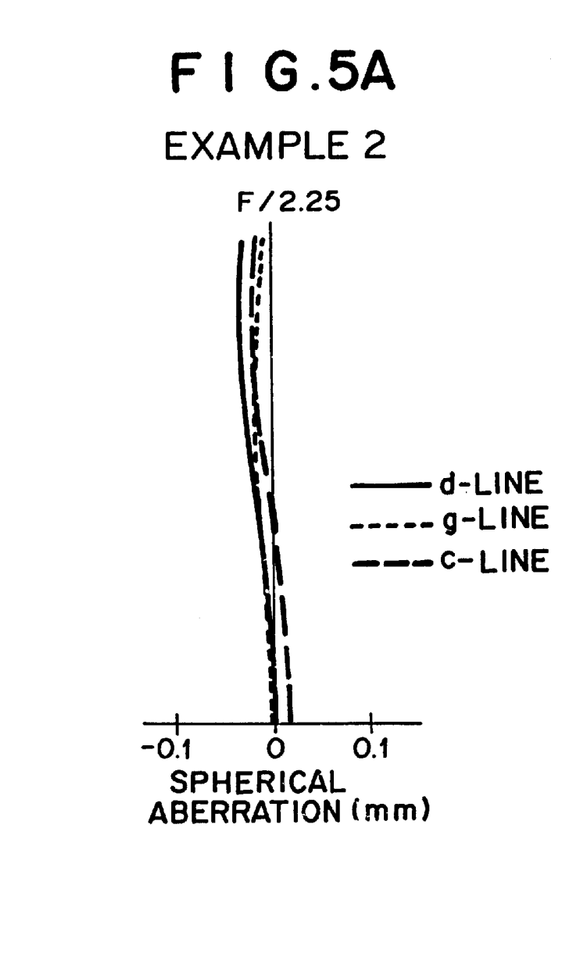
FIGS. 5A, 5B and 5C are aberration charts of the wide-angle lens having a long back focus in accordance with Example 2.
Figure 5B:
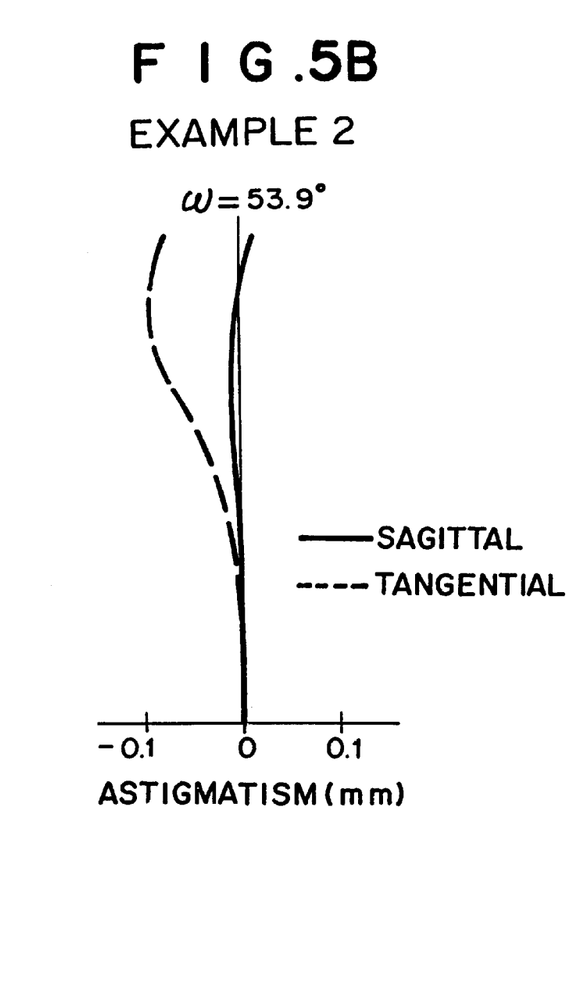
Figure 5C:
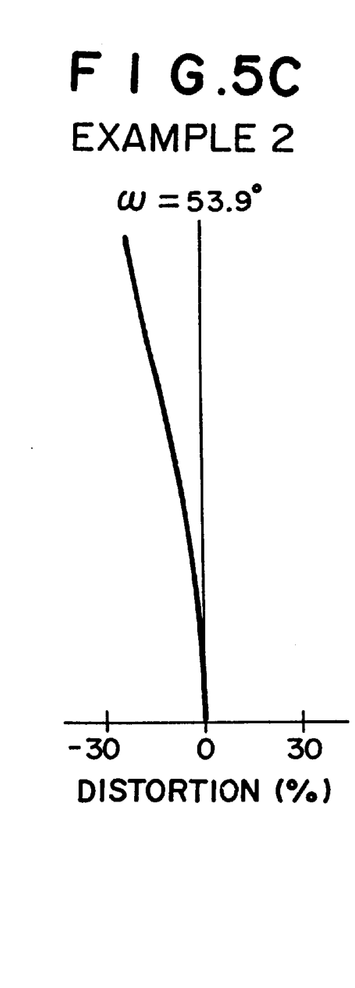
Figure 6A:
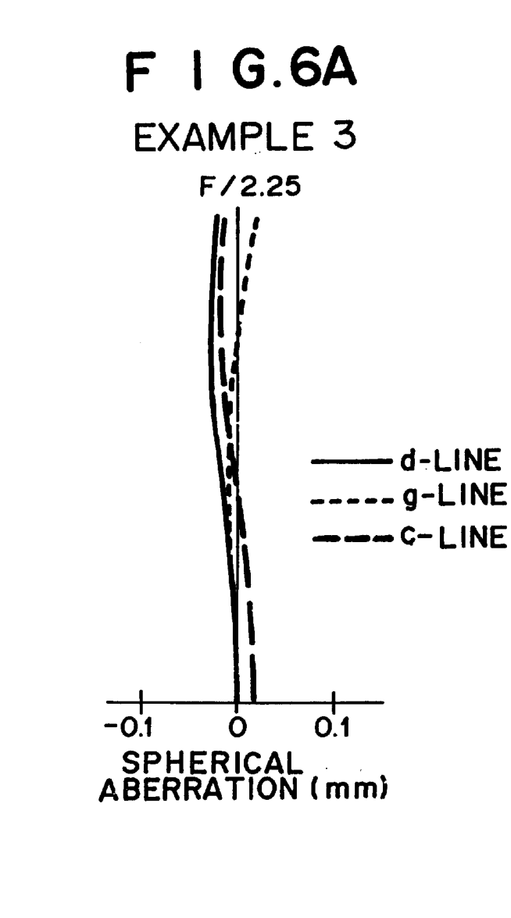
FIGS. 6A, 6B and 6C are aberration charts of the wide-angle lens having a long back focus in accordance with Example 3.
Figure 6B:
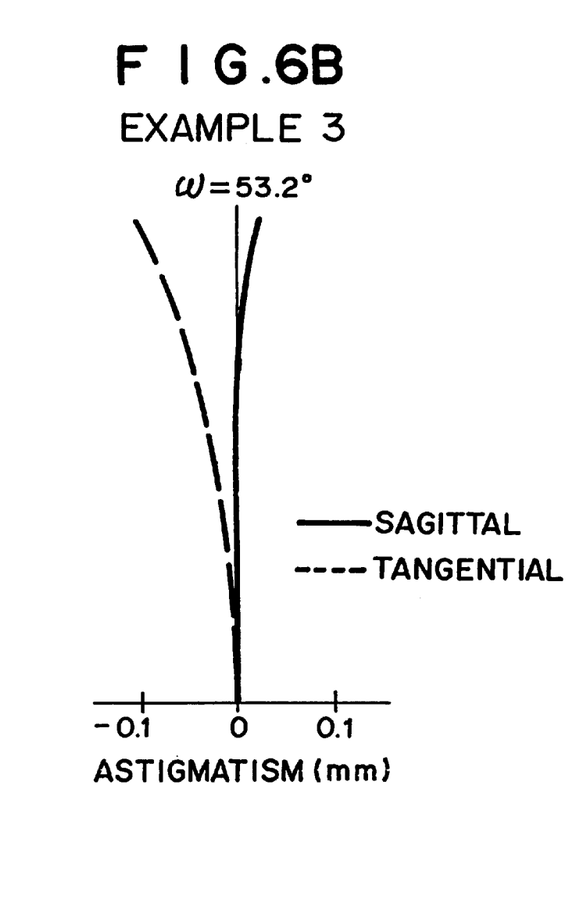
Figure 6C:
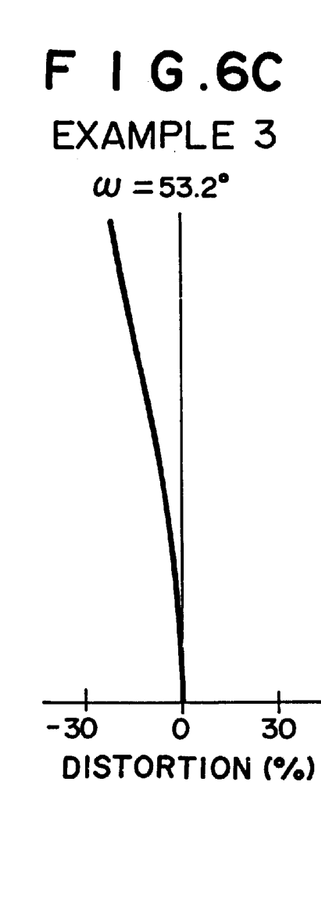

FIG. 3 shows the configuration of the wide-angle lens having a long back focus in accordance with Example 3. This configuration is substantially the same as that of Example 1 except for the forms of the fourth lens $L_4$, fifth lens $L_5$, and seventh lens $L_7$. Namely, the fourth lens $L_4$ is made of a biconcave lens having a surface with a greater curvature directed onto the image surface side, the fifth lens $L_5$ is made of a positive meniscus lens having a convex surface directed onto the object side, and the seventh lens $L_7$ is made of a biconvex lens having a surface with a greater curvature directed onto the image surface side.

Table 3 (follows) shows the radius of curvature R (mm) of each lens surface, axial surface space of each lens (center thickness of each lens or air space between neighboring lenses) D (mm), and refractive index $N_D$ and Abbe number v of each lens at D-line in Example 3. Also, the lower part of Table 3 shows the focal length f (mm) of the whole system, F number, distance $D_{EXP}$ (mm) from the imaging surface position to the exit pupil position, and respective values corresponding to conditional expressions (1) to (6).

As shown in Table 3, Example 3 satisfies all of conditional expressions (1) to (6), thus clearly being a wide-angle lens having a long back focus and a far exit pupil position.

FIGS. 4A to 6C are aberration charts showing aberrations (spherical aberration, astigmatism, and distortion) of the wide-angle lenses having a long back focus in accordance with Examples 1 to 3. In these aberration charts, ω indicates the half angle of view. As shown in FIGS. 4A to 6C, it is clear that the wide-angle lenses having a long back focus in accordance with Examples 1 to 3 are those having a wide angle of view of 53 degrees in terms of half angle of view, in which each kind of aberration is favorably corrected.

As explained in the foregoing, the wide-angle lens having a long back focus in accordance with the present invention can make the exit pupil position farther, while achieving a wide angle of view of 53 degrees in terms of half angle of view, so as to suppress the occurrence of color shading, thus being able to obtain a wide-angle lens having a long back focus sufficient for disposing a three-color-separating optical system.

TABLE 1

Example 1

| Surface | R | D | ND | υ |
|---|---|---|---|---|
| 1 | 25.090 | 1.20 | 1.72342 | 38.0 |
| 2 | 9.143 | 4.07 | | |
| 3 | 79.407 | 1.00 | 1.66672 | 48.3 |
| 4 | 10.810 | 5.75 | | |
| 5 | 28.340 | 3.68 | 1.80518 | 25.4 |
| 6 | −19.276 | 0.10 | | |
| 7 | 46.052 | 1.00 | 1.83500 | 43.0 |
| 8 | 7.711 | 11.29 | | |
| 9 | 49.022 | 1.00 | 1.84666 | 23.9 |
| 10 | −80.529 | 3.65 | | |
| 11 | ∞ | 1.50 | (aperture stop) | |
| 12 | −43.250 | 1.19 | 1.83500 | 43.0 |
| 13 | 8.040 | 0.95 | | |
| 14 | 11.367 | 3.32 | 1.69895 | 30.1 |
| 15 | −12.899 | 1.82 | | |
| 16 | 66.169 | 1.00 | 1.84666 | 23.9 |
| 17 | 7.424 | 3.14 | 1.48749 | 70.2 |
| 18 | −16.969 | 0.10 | | |
| 19 | 27.316 | 4.73 | 1.51680 | 64.2 |
| 20 | −10.076 | 4.74 | | |
| 21 | ∞ | 12.80 | 1.70154 | 41.1 |
| 22 | ∞ | 3.55 | 1.51680 | 64.2 |
| 23 | ∞ | | | |
| | f | 2.85 | | |
| | FNO | 2.25 | | |
| | $D_{EXP}$ | 881 | | |
| (1) | Bf/f | 5.1 | | |
| (2) | TAN 74 | 0.0 | | |
| (3) | $f/f_{G1}$ | −0.14 | | |
| (4) | $f/f_{G1a}$ | −0.32 | | |
| (5) | $N_8-N_9$ | 0.36 | | |
| (6) | $R_{13}/D_{13}$ | 8.4 | | |

TABLE 2

Example 2

| Surface | R | D | ND | 98 |
|---|---|---|---|---|
| 1 | 29.558 | 1.20 | 1.72342 | 38.0 |
| 2 | 8.730 | 4.89 | | |
| 3 | −49.927 | 4.10 | 1.66672 | 48.3 |
| 4 | 12.834 | 1.30 | | |
| 5 | 20.720 | 4.00 | 1.80518 | 25.4 |
| 6 | −16.867 | 0.10 | | |
| 7 | 37.929 | 1.00 | 1.83500 | 43.0 |
| 8 | 7.419 | 11.34 | | |
| 9 | −5017.163 | 1.00 | 1.84666 | 23.9 |
| 10 | −31.786 | 3.62 | | |
| 11 | ∞ | 1.60 | (aperture stop) | |
| 12 | −31.752 | 1.23 | 1.83500 | 43.0 |
| 13 | 9.127 | 0.98 | | |
| 14 | 12.195 | 2.31 | 1.69895 | 30.1 |
| 15 | −13.863 | 2.88 | | |
| 16 | 118.640 | 1.00 | 1.84666 | 23.9 |
| 17 | 8.001 | 3.17 | 1.51680 | 64.2 |
| 18 | −15.413 | 0.10 | | |
| 19 | 20.961 | 4.68 | 1.51680 | 64.2 |
| 20 | −11.771 | 4.88 | | |
| 21 | ∞ | 12.80 | 1.70154 | 41.1 |
| 22 | ∞ | 3.55 | 1.51680 | 64.2 |
| 23 | ∞ | | | |
| | f | 2.85 | | |
| | FNO | 2.25 | | |
| | $D_{EXP}$ | 381 | | |
| (1) | Bf/f | 5.2 | | |
| (2) | TAN θ | 0.01 | | |
| (3) | $f/f_{G1}$ | −0.18 | | |
| (4) | $f/f_{G1a}$ | −0.43 | | |
| (5) | $N_8-N_9$ | 0.33 | | |
| (6) | $R_{13}D_{13}$ | 9.4 | | |

TABLE 3

Example 3

| Surface | R | D | ND | υ |
|---|---|---|---|---|
| 1 | 21.362 | 1.20 | 1.72342 | 38.0 |
| 2 | 11.230 | 5.10 | | |
| 3 | 26.060 | 1.00 | 1.66672 | 48.3 |
| 4 | 8.628 | 7.30 | | |
| 5 | 40.629 | 3.55 | 1.80518 | 25.4 |
| 6 | −17.503 | 0.58 | | |
| 7 | −98.714 | 1.00 | 1.83500 | 43.0 |
| 8 | 7.015 | 1.68 | | |
| 9 | 39.985 | 1.00 | 1.84666 | 23.9 |
| 10 | 393.671 | 8.45 | | |
| 11 | ∞ | 2.78 | (aperture stop) | |
| 12 | −23.411 | 1.18 | 1.83500 | 43.0 |
| 13 | 9.856 | 0.36 | | |
| 14 | 11.532 | 2.34 | 1.69895 | 30.1 |
| 15 | −10.785 | 4.47 | | |
| 16 | 88.970 | 1.00 | 1.84666 | 23.9 |
| 17 | 8.462 | 3.04 | 1.65160 | 58.5 |
| 18 | −21.173 | 0.10 | | |
| 19 | 22.767 | 4.38 | 1.51680 | 64.2 |
| 20 | −13.859 | 4.74 | | |
| 21 | ∞ | 12.80 | 1.70154 | 41.1 |
| 22 | ∞ | 3.55 | 1.51680 | 64.2 |
| 23 | ∞ | | | |
| | f | 2.86 | | |
| | FNO | 2.25 | | |
| | $D_{EXP}$ | 69 | | |
| (1) | Bf/f | 5.1 | | |
| (2) | TAN θ | 0.04 | | |
| (3) | $f/f_{G1}$ | −0.45 | | |
| (4) | $f/f_{G1a}$ | −0.25 | | |
| (5) | $N_8-N_9$ | 0.20 | | |
| (6) | $R_{13}/D_{13}$ | 27.7 | | |

What is claimed is:

1. A wide-angle lens having a long back focus comprising, successively from an object side, a first lens group having a negative refracting power and a second lens group having a positive refracting power; wherein said first lens group comprises, successively from the object side, a first-a lens group having a negative refracting power and a first-b lens group having a positive refracting power; said wide-angle lens satisfying the following conditional expressions (1) and (2):

$$5.0 < Bf/f \quad (1)$$

$$-0.05 < \tan\theta < 0.05 \quad (2)$$

where f is the focal length of the whole system;

Bf is the back focus of the whole system; and

θ is an angle formed between a principal ray directed to a screen corner portion and an optical axis.

2. A wide-angle lens having a long back focus according to claim 1, further satisfying the following conditional expression (3):

$$-0.50 < f/f_{G1} < -0.10 \quad (3)$$

where $f_{G1}$ is the composite focal length of the first lens group.

3. A wide-angle lens having a long back focus according to claim 1, further satisfying the following conditional expression (4):

$$-0.45 < f/f_{G1a} < -0.23 \quad (4)$$

where $f_{G1a}$ is the composite focal length of the first-a lens group.

4. A wide-angle lens having a long back focus according to claim 1, further satisfying the following conditional expressions (3) and (4):

$$-0.50 < f/f_{G1} < -0.10 \quad (3)$$

$$-0.45 < f/f_{G1a} < -0.23 \quad (4)$$

where $f_{G1}$ is the composite focal length of the first lens group; and $f_{G1a}$ is the composite focal length of the first-a lens group.

5. A wide-angle lens having a long back focus according to claim 1, wherein said first lens group comprises, successively from the object side, a first lens made of a negative meniscus lens having a convex surface directed onto the object side, a second lens made of a negative lens, a third lens made of a biconvex lens, a fourth lens made of a negative lens, and a fifth lens made of a positive lens; and wherein said second lens group comprises, successively from the object side, a sixth lens made of a biconcave lens, a seventh lens made of a biconvex lens, eighth and ninth lenses constituting a cemented lens having a positive refracting power as a whole, and a tenth lens made of a biconvex lens;

said wide-angle lens satisfying the following conditional expressions (5) and (6):

$$0.18 < N_8 - N_9 < 0.38 \quad (5)$$

$$8.0 < R_{13}/D_{13} < 30.0 \quad (6)$$

where $N_i$ is the refractive index of the i-th lens from the object side;

$R_{13}$ is the radius of curvature of the sixth lens on an image surface side; and $D_{13}$ is the axial space between the sixth and seventh lenses.

6. A wide-angle lens having a long back focus according to claim 5, further satisfying the following conditional expression (3):

$$-0.50 < f/f_{G1} < -0.10 \quad (3)$$

where $f_{G1}$ is the composite focal length of the first lens group.

7. A wide-angle lens having a long back focus according to claim 5, further satisfying the following conditional expression (4):

$$-0.45 < f/f_{G1a} < -0.23 \quad (4)$$

where $f_{G1a}$ is the composite focal length of the first-a lens group.

8. A wide-angle lens having a long back focus according to claim 5, further satisfying the following conditional expressions (3) and (4):

$$-0.50 < f/f_{G1} < -0.10 \quad (3)$$

$$-0.45 < f/f_{G1a} < -0.23 \quad (4)$$

where $f_{G1}$ is the composite focal length of the first lens group; and $f_{G1a}$ is the composite focal length of the first-a lens group.

* * * * *